United States Patent
Tsai et al.

(10) Patent No.: US 9,085,341 B2
(45) Date of Patent: Jul. 21, 2015

(54) ELECTRIC POWER ASSIST DEVICE AND DRIVING METHOD FOR ELECTRIC VEHICLE

(75) Inventors: Chia-Chin Tsai, New Taipei (TW); Wen-Hsin Lo, New Taipei (TW)

(73) Assignees: Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 290 days.

(21) Appl. No.: 13/615,675

(22) Filed: Sep. 14, 2012

(65) Prior Publication Data
US 2014/0046541 A1 Feb. 13, 2014

(30) Foreign Application Priority Data
Aug. 8, 2012 (TW) .............................. 101128620 A

(51) Int. Cl.
*A01B 69/00* (2006.01)
*B62M 6/45* (2010.01)

(52) U.S. Cl.
CPC ...................... *B62M 6/45* (2013.01)

(58) Field of Classification Search
USPC ............ 701/22, 36, 41, 51, 53, 57, 58, 65, 99
See application file for complete search history.

(56) References Cited

U.S. PATENT DOCUMENTS

| 2011/0160945 | A1 | 6/2011 | Gale | |
|---|---|---|---|---|
| 2011/0184615 | A1* | 7/2011 | Marcus | 701/58 |
| 2013/0274976 | A1* | 10/2013 | Suzuki | 701/22 |

FOREIGN PATENT DOCUMENTS

| CN | 1078400 | 1/2002 |
|---|---|---|
| DE | 102010032436 | 2/2011 |
| JP | 10016868 | 1/1998 |
| JP | 11011375 | 1/1999 |
| JP | H11334677 | 12/1999 |
| TW | 352071 | 2/1999 |
| TW | 470037 | 12/2001 |
| TW | 570880 | 1/2004 |
| WO | 2012053596 | 4/2012 |

OTHER PUBLICATIONS

"Office Action of Taiwan Counterpart Application," issued on May 6, 2015, p. 1-7.

* cited by examiner

*Primary Examiner* — Kim T Nguyen
(74) *Attorney, Agent, or Firm* — Jianq Chyun IP Office

(57) ABSTRACT

An electric power assist device and a driving method for an electric vehicle are provided. The electric power assist device adapted for the electric vehicle includes an angle sensing unit, a driving module, and a control module. The angle sensing unit senses a tilting angle of the electric vehicle on the road. The driving module includes a power driving unit and a motor. The driving module receives a control signal for driving the electric vehicle by the motor. The control module is coupled to the angle sensing unit and the driving module. The control module adjusts the control signal according to a change of the tilting angle to increase a torque force of the motor when the electric vehicle is on an uphill road.

4 Claims, 3 Drawing Sheets

ELECTRIC POWER ASSIST DEVICE AND DRIVING METHOD FOR ELECTRIC VEHICLE

CROSS-REFERENCE TO RELATED APPLICATION

This application claims the priority benefit of Taiwan application serial no. 101128620, filed on Aug. 8, 2012. The entirety of the above-mentioned patent application is hereby incorporated by reference herein and made a part of this specification.

BACKGROUND OF THE INVENTION

1. Field of the Invention

The invention relates to a vehicle and a driving method thereof, and more particularly relates to an electric power assist device adapted for an electric vehicle and a driving method for the electric vehicle to provide the electric vehicle with sufficient power on an uphill road.

2. Description of Related Art

A bicycle is a vehicle that is driven by manpower and does not consume any fossil energy. Due to energy shortage crisis, etc., many manufacturers begin producing electric bicycles by adding electric motors, batteries, etc. onto bicycles for driving the bicycles by electric power. Some types of electric bicycles are still equipped with pedals to allow the user to select whether to ride the bicycle by manpower or by electric power. On the other hand, some other types of electric bicycles are similar to motorcycles and do not have any pedal. Those electric bicycles are driven by electric power instead of fossil energy (such as gasoline).

According to the traffic regulations in most of the countries, electric bicycles are categorized as low-speed vehicles. Since it may be difficult to put a restriction on the age of electric bicycle users, most countries restrict the maximum speed of electric bicycles by laws in order to reduce the occurrence of traffic accidents, which also limits the weights of the electric bicycles or the output power of its electric motors. However, when the user rides the electric bicycle on an uphill road, insufficient output power of the electric motor may seriously affect the riding of the electric bicycle or electric vehicle. On the contrary, when the user rides the electric bicycle downhill, the speed may become too fast to brake, which may be dangerous for the user.

Therefore, how to provide sufficient power output when the electric bicycle is ridden uphill and how to maintain stability and safety when the electric bicycle is ridden on level or downhill road are important issues that need to be solved.

SUMMARY OF THE INVENTION

The invention provides an electric power assist device and a driving method for an electric vehicle, which provide the electric vehicle with sufficient power on an uphill road and allow the electric vehicle to freewheel on a downhill road, enabling the user to stably and safely drive the electric vehicle.

The invention provides an electric power assist device adapted for an electric vehicle. The electric power assist device includes an angle sensing unit, a driving module, and a control module. The angle sensing unit senses a tilting angle of the electric vehicle on the road. The driving module includes a power driving unit and an electric motor. The power driving unit receives a control signal to generate a driving current, and the electric motor receives the driving current to drive the electric vehicle. The control module is coupled to the angle sensing unit and the driving module. The control module adjusts the control signal according to a change of the tilting angle to increase a torque force of the electric motor when the electric vehicle is on an uphill road.

From another aspect, the invention provides a driving method for the electric vehicle, and the driving method includes the following steps. An angle sensing unit is used to sense a tilting angle of the electric vehicle on the road. A control signal is adjusted according to a change of the tilting angle. A power driving unit is used to receive the control signal to generate a driving current. An electric motor is used to receive the driving current and drive the electric vehicle, so as to increase a torque force of the electric motor when the electric vehicle is on an uphill road.

Based on the above, the electric power assist device and the driving method according to the embodiments of the invention utilize the angle sensing unit to detect the tilting angle of the electric vehicle and use a processing module to dynamically adjust the driving voltage/current of the electric motor according to the change of the tilting angle, so that the electric vehicle has sufficient torque force on the uphill road to maintain the speed thereof. Moreover, the electric motor of the electric vehicle is stopped on the downhill road, which allows the electric vehicle to freewheel and enables the user to stably and safely drive the electric vehicle.

To make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
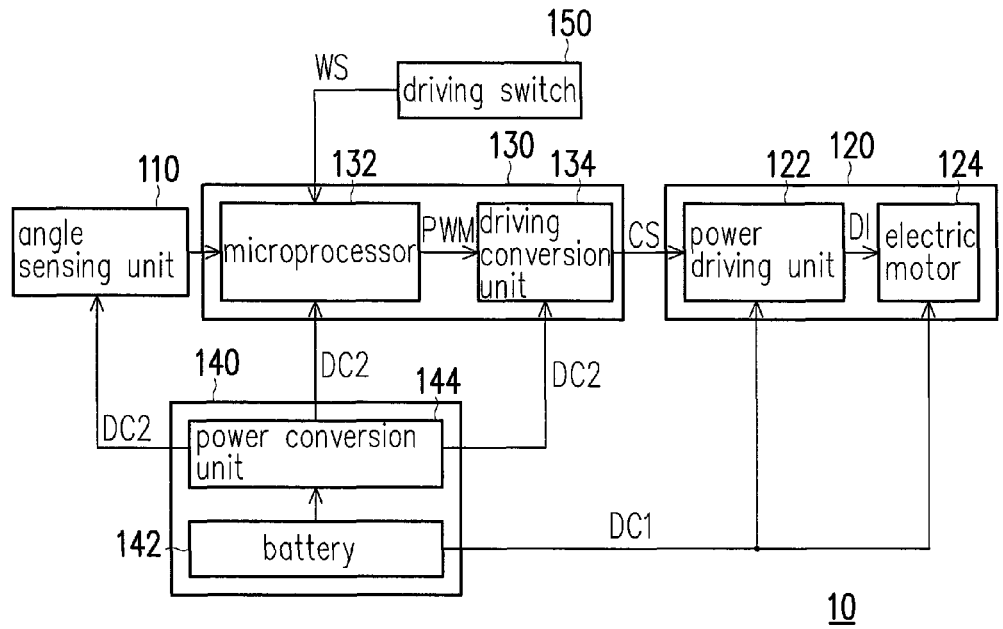
FIG. 1 is a block diagram illustrating an electric power assist device according to an embodiment of the invention.

Referring to FIG. 1, FIG. 1 is a block diagram illustrating an electric power assist device 10 according to an embodiment of the invention. As shown in FIG. 1, the electric power assist device 10 is adapted for an electric vehicle. In this embodiment, the electric vehicle refers to an electric bicycle which is equipped with a manpower driving device and the electric power assist device 10. The electric bicycle is for example a chain type, belt type, or hub type electric bicycle. Of course, the embodiment of the invention is also applicable to an electric bicycle that is driven simply by electric power and includes no manpower driving device.

The electric power assist device 10 includes an angle sensing unit 110, a driving module 120, and a control module 130. The angle sensing unit 110 is used for sensing a tilting angle of the electric vehicle on the road. That is to say, the angle sensing unit 110 detects an included angle between the road and a horizontal plane as the tilting angle, so as to obtain changes of the position and path of the electric vehicle. In this embodiment, the angle sensing unit 110 may be a G sensor, which senses a gravity change of a movement direction of the electric vehicle to provide a three-axis acceleration value (e.g. a gravity acceleration value of X axis, Y axis, and Z axis), so as to provide the aforementioned tilting angle. A microprocessor 132 in the control module 130 calculates the changes of the tilting angle and position, etc. of the electric vehicle based on the three-axis acceleration value with a corresponding algorithm, thereby determining a slope of the road that the electric vehicle is traveling on. In some of the embodiments, the angle sensing unit 110 may adopt a mechanical gyroscope to sense the tilting angle of the electric vehicle.

The driving module 120 is used for driving the electric vehicle. Since the driving method of the electric vehicle may vary according to the type of the electric vehicle (e.g. chain type, belt type, or hub type electric bicycle), this embodiment does not restrict the way of driving the wheels of the electric vehicle on the road. Specifically, the driving module 120 includes a power driving unit 122 and an electric motor 124. The power driving unit 122 is a combination of power switch devices, which is a main component for driving load (i.e. the electric motor 124). The power driving unit 122 receives a control signal CS transmitted from the control module 130 and a DC voltage DC1 supplied from a power supply module 140, so as to generate a driving current DI. The electric motor 124 receives the driving current DI to drive the electric vehicle.

In this embodiment, the electric motor 124 is a DC brushless motor. The DC brushless motor has lower output torque force as the revolution speed increases, and the revolution speed of the motor and the decrease of the output torque force have a linear relationship. However, given that the DC brushless motor is supplied with a constant driving voltage, the output torque force is increased when more driving current DI is supplied to the DC brushless motor. A value of the supplied driving current also has a linear relationship with the output torque force of the motor.

Accordingly, the control module 130, coupled to the angle sensing unit 110 and the driving module 120, adjusts the control signal CS according to the change of the tilting angle, so as to increase the driving current DI and further to increase the torque force of the electric motor 120 when the electric vehicle is on the uphill road. On the contrary, when the electric vehicle is on the downhill road, the supply of the driving current DI is stopped to stop the operation of the electric motor 124, such that the user may drive the electric vehicle by freewheeling by weight inertia to save energy.

In this embodiment, the control module 130 includes a driving switch 150, a microprocessor 132, and a driving conversion unit 134. The driving switch 150 is used for generating a switch signal WS. The driving switch 150 is for example a pedal switch. In this embodiment of the invention, the revolution speed of the electric motor 124 is adjusted by coordinating the levels that the pedal switch may present with the maximum revolution speed of the electric motor 124 set by the microprocessor 132. That is, the levels presented by the driving switch 150 of the electric power assist device 10 correspond to different motor revolution speeds, so as to decide a normal revolution speed of the electric motor 124. Therefore, the operation of the pedal switch is similar to the gas pedal of an automobile that the electric motor outputs different revolution speeds when different external forces are applied to the pedal switch.

Figure 2:
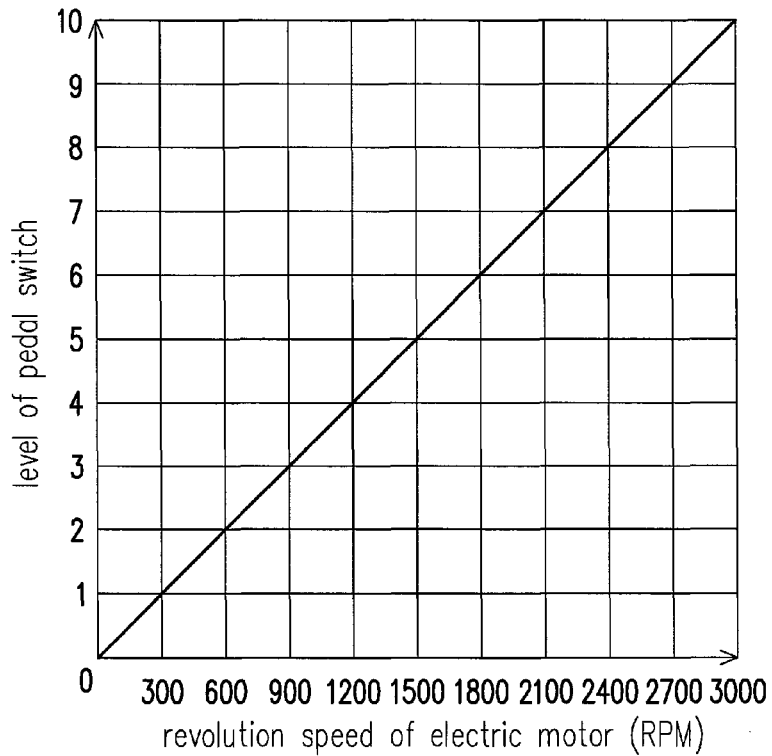
FIG. 2 is a diagram showing a relationship between a level of a driving switch and a RPM of an electric motor.

FIG. 2 is a diagram showing a relationship between the level of the driving switch 150 and the RPM of the electric motor 124. Referring to FIG. 1 and FIG. 2, the user may set the revolution speed of the electric motor 124 by the strength that presses down the driving switch 150. For example, if the level of the driving switch 150 is "5," the revolution speed of the electric motor 124 is estimated to reach 1500 RPM (Revolutions per Minute); and if the level of the driving switch 150 is "10," the revolution speed of the electric motor 124 is estimated to reach 3000 RPM.

The microprocessor 132 is used for collecting, calculating, and determining environment data of the electric vehicle and controlling the electric motor 124. In particular, the microprocessor 132 receives the switch signal WS and tilting angle information measured by the angle sensing unit 110. The microprocessor 132 sets the revolution speed of the electric motor 124 according to the switch signal WS and adjusts a pulse width modulation signal PWM according to the change of the tilting angle. The driving conversion unit 134 is coupled to the microprocessor 132 and receives the pulse width modulation signal PWM to generate the control signal CS. The driving conversion unit 134 is a conversion interface unit between the microprocessor 132 and the power driving unit 122. The driving conversion unit 134 converts the pulse width modulation signal PWM that the microprocessor 132 uses for controlling the motor to a voltage/current level for controlling the motor, so as to produce the control signal CS.

Moreover, the electric power assist device 10 of FIG. 1 further includes a power supply module 140. The power supply module 140 includes a battery 142 and a power conversion unit 144. The battery 142 supplies power to the driving module 120 and the power conversion unit 144. The power conversion unit 144 is coupled to the battery 142. The power conversion unit 144 respectively converts and supplies power conforming to the angle sensing unit 110 and the control module 130 according to the power supplied by the battery 142. For example, the power conversion unit 144 supplies a +3.3V DC voltage DC2 to the angle sensing unit 110 and the control module 130, and the battery 142 supplies +12V/+24V DC voltages to the driving module 120 and the power conversion unit 144.

Figure 3:
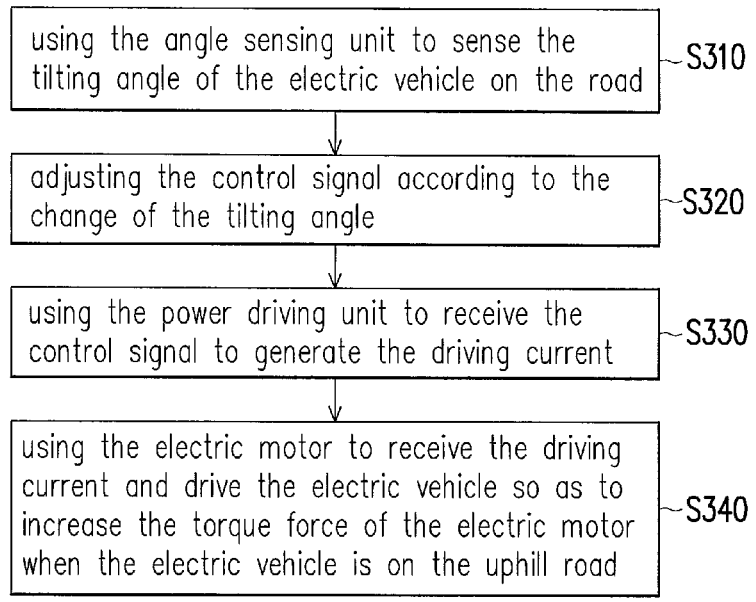
FIG. 3 is a flowchart showing a driving method for an electric vehicle according to an embodiment of the invention.

From another aspect, this embodiment can also use the hardware framework disclosed in FIG. 1 and the above to embody the following driving method for electric vehicle. FIG. 3 is a flowchart showing a driving method for an electric vehicle according to an embodiment of the invention. With reference to FIG. 1 and FIG. 3, first in Step S310, the microprocessor 132 in the electric power assist device 10 uses the angle sensing unit 110 to sense the tilting angle of the electric vehicle on the road. In Step S320, the microprocessor 132 adjusts the control signal CS according to the change of the tilting angle measured by the angle sensing unit 110. In Step S330, the microprocessor 132 uses the power driving unit 122 to receive the control signal CS to generate the driving current DI. In Step S340, the electric motor 124 is used to receive the driving current DI and drive the electric vehicle, so as to increase the torque force of the electric motor 124 when the electric vehicle is on the uphill road.

Figure 4:
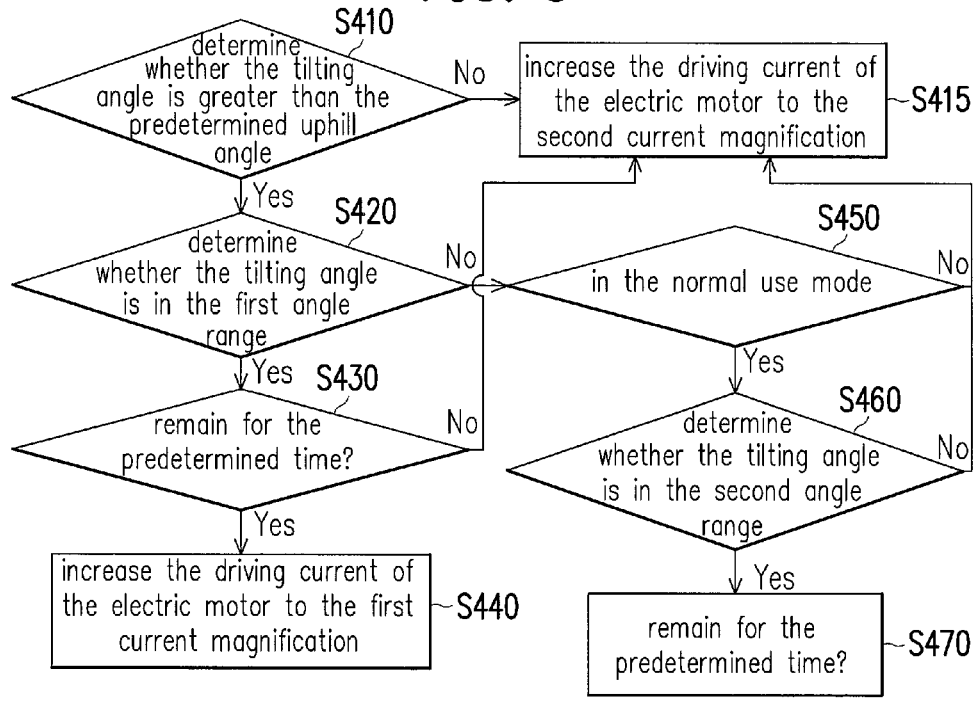
FIG. 4 is a first detailed flowchart of Step S320 of FIG. 3.

To be more specific, in Step S320 of FIG. 3, there are several ways to achieve adjustment of the control signal CS based on the change of the tilting angle to increase the torque force of the electric motor when the electric vehicle is on the uphill road. Details are provided below with reference to FIG. 4. FIG. 4 is a first detailed flowchart of Step S320 of FIG. 3. With reference to FIG. 1 and FIG. 4, in Step S410, the microprocessor 132 determines whether the tilting angle of the electric vehicle is greater than a predetermined uphill angle (e.g. +10 degrees). If the tilting angle is smaller than the predetermined uphill angle (+10 degrees), it indicates that the electric vehicle is on a relatively level road, and a state that the electric power assist device 10 is on the level road is referred to as a normal use mode in this embodiment. That is, the electric power assist device 10 is in the normal use mode now (Step S415).

By contrast, when the control module 130 determines that the tilting angle of the electric vehicle is greater than the predetermined uphill angle (+10 degrees) and remains greater than the predetermined uphill angle (+10 degrees) for a predetermined time (e.g. 3 to 5 seconds), the control module 130 increases the driving current DI by the control signal CS, so as to increase the torque force of the electric motor 124.

For instance, after entering Step S420 from Step 410, the control module 130 determines whether the tilting angle of the electric vehicle is within a first angle range. The first angle range is for example between +10 and +25 degrees. If the tilting angle remains in the first angle range for the predetermined time (e.g. 3 to 5 seconds) (Step S430), the control module 130 increases the driving current of the electric motor to a first current magnification (e.g. 30%) (Step S440) by the control signal CS. In this embodiment, the microprocessor 132 increases the driving current of the electric motor 124 in the normal use mode by 30%, so as to increase the torque force of the electric motor 124.

If the control module 130 determines that the tilting angle of the electric vehicle is not in the first angle range but in a second angle range, the process enters Step S460 via Step S450 from Step S420 to determine if the tilting angle remains in the second angle range for the predetermined time (e.g. 3 to 5 seconds) (Step S460). The second angle range is for example a range greater than +25 degrees. If the tilting angle remains in the second angle range for the predetermined time (e.g. 3 to 5 seconds) (Step S460), the control module 130 increases the driving current of the electric motor to a second current magnification (e.g. 50%) (Step S440) by the control signal CS. The tilting angle in the second angle range is greater than the tilting angle in the first angle range. When the process enters Step S470 from Step S460, it indicates that the electric vehicle requires greater torque force to maintain the speed. Therefore, the first current magnification (30%) is smaller than the second current magnification (e.g. 50%). In this embodiment, the microprocessor 132 increases the driving current of the electric motor 124 in the normal use mode by 50%, so as to increase the torque force of the electric motor 124.

Another way to achieve the increase of the torque force when the electric vehicle is on the uphill road is that: if the tilting angle is greater than the predetermined uphill angle (10 degrees), the microprocessor 132 may refer to a current adjustment table stored therein to obtain a current magnification corresponding to the tilting angle. Then, the microprocessor 132 increases the driving current DI of the electric motor 124 to the current magnification by the control signal CS.

Figure 5:
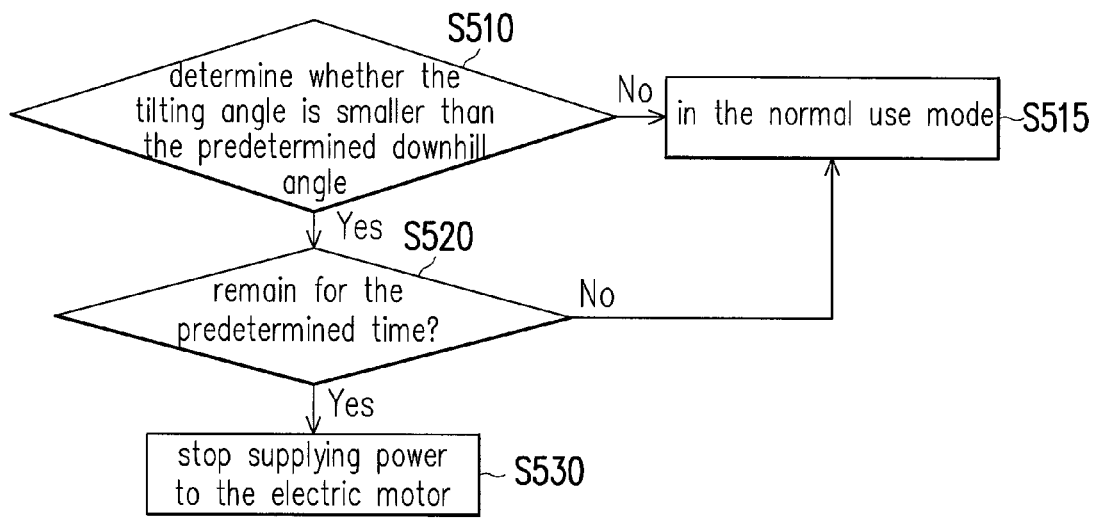
FIG. 5 is a second detailed flowchart of Step S320 of FIG. 3.

This embodiment is not only applicable for increasing the torque force of the motor when the electric vehicle is on the uphill road but also allows the electric vehicle to freewheel downhill. FIG. 5 is a second detailed flowchart of Step S320 of FIG. 3. With reference to FIG. 1 and FIG. 5, in Step S510, the microprocessor 132 determines whether the tilting angle of the electric vehicle is smaller than a predetermined downhill angle (e.g. −10 degrees). If the tilting angle is greater than the predetermined downhill angle (−10 degrees), it indicates that the electric vehicle is on a relatively level road (e.g. +10 to −10 degrees). That is, the electric power assist device 10 is in the normal use mode now (Step S515).

By contrast, if the control module 130 determines that the tilting angle of the electric vehicle is smaller than the predetermined downhill angle (−10 degrees) (Step S510) and remains smaller than the predetermined downhill angle for the predetermined time (e.g. 3 to 5 seconds) (Step S520), the control module 130 adjusts the control signal CS to stop supplying power to the electric motor 124, e.g. stop the driving current DI for the electric motor 124 (Step S530), allowing the electric vehicle to freewheel or be driven by manpower, so as to save power. Accordingly, the electric power assist device 10 automatically turns off the power of the electric motor 124 when the electric vehicle is on the downhill road, or automatically recharges the electric motor 124 on the downhill road, so as to save power.

To conclude the above, the electric power assist device and the driving method for electric vehicle according to the embodiments of the invention utilize the angle sensing unit to detect the tilting angle of the electric vehicle and use the processing module to dynamically adjust the driving voltage/current of the electric motor according to the change of the tilting angle, so that the electric vehicle has sufficient torque force on the uphill road to maintain the speed thereof. Moreover, the electric motor of the electric vehicle is stopped on the downhill road, which allows the electric vehicle to freewheel and enables the user to stably and safely drive the electric vehicle.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A driving method for an electric vehicle, comprising:
    using an angle sensing unit to sense a tilting angle of the electric vehicle on a road;
    adjusting a control signal according to a change of the tilting angle;
    using a power driving unit to receive the control signal to generate a driving current; and
    using an electric motor to receive the driving current and drive the electric vehicle so as to increase a torque force of the electric motor when the electric vehicle is on an uphill road;
    wherein adjusting the control signal according to the change of the tilting angle comprises:
    increasing the driving current of the electric motor to increase the torque force of the electric motor when the tilting angle remains greater than a predetermined uphill angle for a predetermined time, and determining whether the tilting angle is in a first angle range or a second angle range when the tilting angle is greater than the predetermined uphill angle;
    increasing the driving current of the electric motor to a first current magnification by the control signal when the tilting angle remains in the first angle range for the predetermined time; and
    increasing the driving current of the electric motor to a second current magnification by the control signal when the tilting angle remains in the second angle range for the predetermined time, wherein the first current magnification is less than the second current magnification.

2. The driving method according to claim 1, further comprising:

adjusting the control signal to stop supplying the driving current to the electric motor when the tilting angle remains smaller than a predetermined downhill angle for a predetermined time.

3. The driving method according to claim 1, wherein adjusting the control signal according to the change of the tilting angle comprises:

when the tilting angle is greater than the predetermined uphill angle, referring to a current adjustment table according to the tilting angle to obtain a current magnification corresponding to the tilting angle and increasing the driving current of the electric motor to the current magnification by the control signal.

4. A driving method for an electric vehicle, comprising:

using an angle sensing unit to sense a tilting angle of the electric vehicle on a road;

adjusting a control signal according to a change of the tilting angle;

using a power driving unit to receive the control signal to generate a driving current; and using a DC brushless motor to receive the driving current and drive the electric vehicle so as to increase a torque force of the electric motor when the electric vehicle is on an uphill road, wherein the driving method further comprises: increasing the driving current of the electric motor to increase the torque force of the electric motor when the tilting angle remains greater than a predetermined uphill angle for a predetermined time;

determining whether the tilting angle is in a first angle range or a second angle range when the tilting angle is greater than the predetermined uphill angle;

increasing the driving current of the electric motor to a first current magnification by the control signal when the tilting angle remains in the first angle range for the predetermined time; and increasing the driving current of the electric motor to a second current magnification by the control signal when the tilting angle remains in the second angle range for the predetermined time, wherein the first current magnification is less than the second current magnification.

\* \* \* \* \*